United States Patent [19]

Takahashi et al.

[11] 4,435,560
[45] Mar. 6, 1984

[54] MALEIMIDE: ARYLOXY DIAMINE RESIN COMPOSITION AND PROCESS FOR PRODUCING SAME

[75] Inventors: Akio Takahashi, Hitachiohta; Moloyo Wajima, Hitachi; Akio Nishikawa, Hitachi; Hirosada Morishita, Hitachi, all of Japan

[73] Assignee: Hitachi, Ltd., Tokyo, Japan

[21] Appl. No.: 300,624

[22] Filed: Sep. 9, 1981

[30] Foreign Application Priority Data

Sep. 9, 1980 [JP] Japan ................... 55-124044

[51] Int. Cl.³ .................................. C08G 73/10
[52] U.S. Cl. ........................ 528/170; 428/473.5; 524/104; 524/602; 525/423; 526/262; 528/117; 528/316; 528/317; 528/322
[58] Field of Search ............... 528/170, 322; 526/262

[56] References Cited

U.S. PATENT DOCUMENTS

| | | | |
|---|---|---|---|
| 2,686,773 | 8/1954 | D'Alelio | 526/262 |
| 3,669,930 | 6/1972 | Asahara et al. | 528/170 |
| 3,910,859 | 10/1975 | Bargain | 528/170 |
| 4,064,192 | 12/1977 | Bargain | 528/170 |
| 4,205,151 | 5/1980 | Dale et al. | 526/262 |
| 4,299,946 | 11/1981 | Balme et al. | 528/170 |

OTHER PUBLICATIONS

The Naming and Indexing of Chemical Compounds from Chemical Abstracts, 1962, pp. 49n, 52n.

*Primary Examiner*—Harold D. Anderson
*Attorney, Agent, or Firm*—Antonelli, Terry & Wands

[57] ABSTRACT

The disclosure is concerned with a maleimide-diamine resin composition which is well soluble to a low boiling point solvent and is excellent in heat resistance. The composition is featured by containing a maleimide-diamine adduct having the general formula:

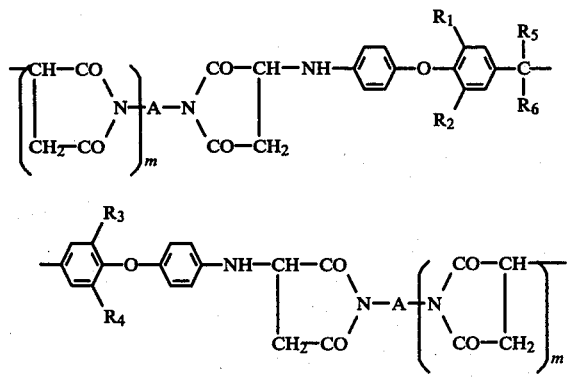

wherein A is a mono-, di-, tri- or tetravalent organic group containing at least two carbon atoms, $R_1$ through $R_6$ are hydrogen atom, a lower alkyl group, a lower alkoxy group, chlorine atom, bromine atom, trifluoromethyl group, or trichloromethyl group, and m is an integer of 0–4.

16 Claims, No Drawings

MALEIMIDE: ARYLOXY DIAMINE RESIN COMPOSITION AND PROCESS FOR PRODUCING SAME

BACKGROUND OF THE INVENTION

The present invention relates to heat resistant maleimide resins and a process for producing the heat resistant resins, which are soluble in low boiling temperature solvents and have an excellent workability.

As materials having a heat resistance of at least heat-resistant class H (180° C.), there have been well known polyimides of dehydration-condensation type and maleimids of amine-curing type. Among them, aromatic bismaleimides of amine-curing type which are free of problems of condensed water, etc. are now becoming the most important materials in the field.

As maleimides of amine-curing type, aminobis maleimides whose main structure is an aromatic bismaleimide are most widely used. The aminobismaleimides are prepolymers comprising aromatic bismaleimides added with aromatic diamines at the double bond of the former. If the aminobismaleimides are heated, complicated cross linkages are formed due to the amine addition and the radical polymerization of the double bonds to yield polymers having quite excellent heat resistance.

However, in case where the aromatic aminobismaleimides or the aromatic bismaleimides are prepared and used in the form of a solution, a high boiling point solvent such as N-methyl-2-pyrrolidone or N,N-dimethylformamide is necessitated and, as a result, problems of workability, etc. is necessary to dissolve both the bismaleimide and the resulting prepolymer (aminobismaleimide).

Further, a high temperature and a long period of time are required for curing the prepolymer by removing the solvent and by effecting chemical reactions.

There have been known various type of maleimide resins disclosed in such as U.S. Pat. No. 3,678,008, U.S. Pat. No. 4,005,154, U.S. Pat. No. 4,064,193, U.S. Pat. No. 3,883,486, U.S. Pat. No. 3,732,188, U.S. Pat. No. 4,131,632, French Patent No. 76 18582 (Publication No. 2,316,267), U.S. Pat. No. 3,878,172, U.S. Pat. No. 4,064,835, British Pat. No. 1,407,511, British Pat. No. 1,457,270 British Pat. No. 1,355,407 (=German Offenlegungsschrift No. 2,230,874) and British Pat. No. 1,395,761 (=German Offenlegungsschrift No. 2,212,661). These prior arts do not disclose diamines represented by the formula:

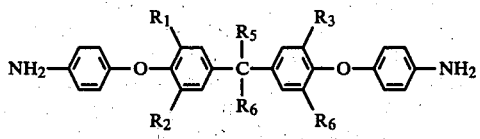

Diamines of this type are disclosed in such as British Pat. No. 1,030,026, U.S. Pat. No. 4,017,459 and U.S. Pat. No. 3,505,288.

The present invention have found that the above-mentioned aromatic diamines are particularly useful as a diamine component for production of maleimide prepolymers, which are well soluble to low boiling temperature solvents.

According to the present invention there is provided a new maleimide resin obtained by reacting under heating a maleimide compound having the general formula:

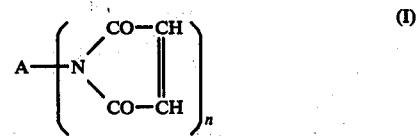

with an aromatic diamine having the general formula:

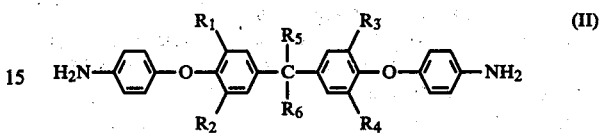

where A is an organic group having at least two carbon atoms, especially aromatic and/or aliphatic groups of $C_2$–$C_{25}$, n is an integer of 1 to 5, $R_1$ through $R_4$ are the same or different atoms or groups selected from the group of hydrogen, lower alkyl group having carbon atoms of 1 to 8, lower alkoxy group having carbon atoms of 1 to 8, chlorine and bromine, and $R_5$ and $R_6$ are the same or different atoms or groups selected from the group of hydrogen, methyl group, ethyl group, trifluoromethyl group, and trichloromethyl group.

SUMMARY OF THE INVENTION

An object of the present invention is to provide a heat resistant maleimide, a maleimide prepolymer thereof and a process for producing the heat resistant maleimide resin, having an excellent processability and a high heat resistance.

The present invention provides a heat resistant resin composition comprising a maleimide-diamine adduct obtained by reacting under heating a maleimide compound of the general formula:

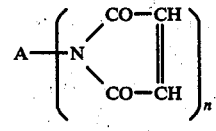

wherein A represents an organic group containing at least two carbon atoms, especially aromatic and/or aliphatic groups of $C_1$–$C_{25}$, and n represents an integer of 1–5 with an ether bond-containing diamine compound of the general formula:

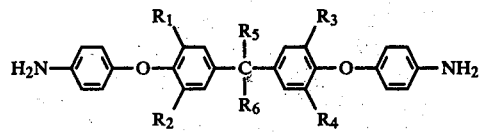

wherein $R_1$ through $R_4$ which may be the same as or different from one another represent hydrogen atom, a lower alkyl group, a lower alkoxyl group, chlorine atom or bromine atom and $R_5$ and $R_6$ which may be the same as or different from each other represent hydrogen atom, methyl group, ethyl group, trifluoromethyl group or trichloromethyl group. The composition may contain a reaction product by radical polymerization of a maleimide compound haing the general formula

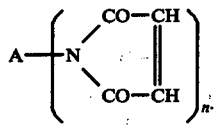

The present invention also provides a heat resistant resin composition comprising the maleimide-diamine adduct and the radical polymerization reaction product of the maleimide compound, and an epoxy compound having at least two epoxy groups.

The present invention provides a maleimide resin composition comprising a maleimide-diamine adduct having the recurring units:

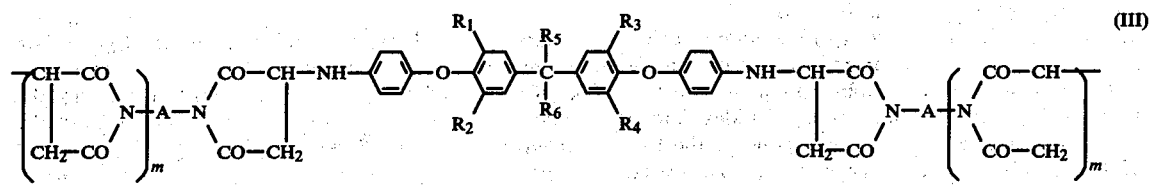

wherein A represents monovalent, divalent, trivalent or tetravalent organic group containing at least two carbon atoms, m represents an integer of 0 to 4, $R_1$ through $R_4$ which may be the same or different represent hydrogen atom, a lower alkyl group, a lower alkoxy alkoxy group, chlorine atom or bromine atom, and $R_5$ and $R_6$ which may be the same or different represent hydrogen atom, methyl group, ethyl group, trifluoromethyl group or trichloromethyl group. The practical molecular weight of the above prepolymer ranges from about 450 to about 4300.

The adduct is well soluble in a solvent having a boiling point of 130° C. or lower to form a solution of a concentration of 50% or more.

The present invention also provides a maleimide resin composition comprising the above-mentioned maleimide-diamine adduct and an epoxy compound having at least two 1,2-epoxy groups.

DETAILED DESCRIPTION OF THE INVENTION

According to the present invention wherein maleimide compounds of above general formula (I) having at least one unsaturated bond are reacted with specific aromatic diamine compounds of above general formula (II) having two ether bonds, the solubilities of them in low boiling point solvents such as acetone, methyl ethyl ketone and methyl cellosolve can be remarkably increased. In addition, if the uncured reaction products (hereinafter referred to as prepolymers) ar cured, the resulting cured products have a heat resistance higher than that of aminobismaleimides used in the prior art. If an epoxy compound or compounds are further incorporated therein and reacted therewith, the curing properties can be further improved. Though an epoxy compound may be mixed with compounds (I) and (II) before the reaction of (I) and (II), an epoxy compound is added to the prepolymer (III) obtained by reacting compound (I) with compound (II).

In curing the prepolymer (III) of compounds (I) and (II) or the reaction product of compounds (I), (II) and the epoxy compound according to the present invention, a curing accelerator such as an amine, imidazole or onium compound may be used for further improving the curing properties.

As maleimide compounds (I) used in the present invention, there may be mentioned, for example, N,N'-hexamethylene bismaleimide, N-phenylmaleimide, N,N'-m-phenylene bismaleimide, N,N'-p-phenylene bismaleimide, N,N'-4,4'-diphenylmethane bismaleimide, N,N'-4,4'-diphenyl ether bismaleimide, N,N'-methylene bis(3-chloro-p-phenylene)bismaleimide, N,N'-4,4'-diphenylsulfone bismaleimide, N,N'-4,4'-dicyclo-hexylmethane bismaleimide, N,N'-α,α'-4,4'-dimethylenecyclohexane bismaleimide, N,N'-m-xylene bismaleimide, N,N'-4,4'-diphenylcyclohexane bismaleimide and polyvalent maleimides of the following formula obtained from aniline, formaldehyde condensate and maleic anhydride:

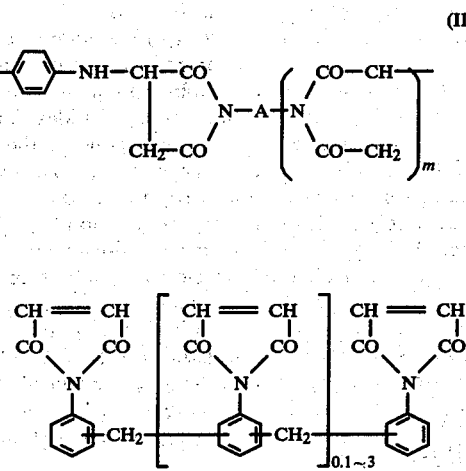

That is, the above polyvalent maleimides are the mixtures of polyvalent maleimides having the different number of maleimide groups.

As the ether bond-containing diamine compounds (II) used in the present invention, there may be mentioned, for example, 2,2'-bis[4-(4-aminophenoxy)-phenyl]propane, 2,2'-bis[3-methyl-4-(4-aminophenoxy)-phenyl]propane, 2,2'-bis[3-chloro-4-(4-aminophenoxy)-phenyl]propane, 2,2'-bis[3-bromo-4-(4-aminophenoxy)-phenyl]propane, 2,2-bis[3-ethyl-4-(4-aminophenoxy)-phenyl]propane, 2,2-bis[3-propyl-4-(4-aminophenoxy)-phenyl]propane, 2,2-bis[3-isopropyl-4-(4-aminophenoxy)phenyl]propane, 2,2-bis[3-butyl-4-(4-amino-phenoxy)-phenyl]propane, 2,2-bis[3-sec.-butyl-4-(4-aminophenoxy)phenyl]propane, 2,2-bis[3-methoxy-4-(4-aminophenoxy)phenyl]propane, 1,1-bis[4-(4-aminophenoxy)-phenyl]ethane, 1,1-bis[3-methyl-4-(4-aminophenoxy)-phenyl]-ethane, 1,1-bis[3-chloro-4-(4-aminophenoxy)-phenyl]ethane, 1,1-bis[3-bromo-4-(4-aminophenoxy)-phenyl]ethane, bis[4-(4-aminophenoxy)phenyl]methane, bis[3-methyl-4-(4-aminophenoxy)phenyl]methane, bis[3-chloro-4-(4-aminophenoxy)-phenyl]methane, bis[3-bromo-4-(4-aminophenoxy)phenyl]-methane, 1,1,1,3,3-hexafluoro-2,2-bis[4-(4-aminophenoxy)-phenyl]propane, 1,1,1,3,3,3-hexachloro-2,2-bis[4-(4-aminophenoxy)phenyl]propane, 3,3-bis[4-(4-aminophenoxy)phenyl]pentane, 1,1-bis[4-(4-aminophenoxy)phenyl]propane, 1,1,1,3,3,3-hexafluoro-2,2-bis[3,5-dimethyl-4-(4-amino-phenoxy)phenyl]propane, 1,1,1,3,3,3-hexafuloro-2,2-bis-[3,5-dibromo-4-(4-aminophenoxy)phenyl]propane and 1,1,1,3,3,3-hexafluoro-2,2-bis[3-methyl-4-(4-aminophenoxy)phenyl]propane.

As epoxy compounds containing at least two epoxy groups used in the present invention, there may be mentioned, for example, difunctional epoxy compounds such ad diglycidyl ether of bisphenol A, 3,4-epoxycyclohexylmethyl-3,4-epoxycyclohexane carboxylate, 4,4'-(1,2-epoxyethyl)biphenyl, 4,4'-di(1,2-epoxyethyl)-diphenyl ether, resorcin diglycidyl ether, bis(2,3-epoxycyclopentyl)ether, N,N'-m-phenylenebis-(4,5'-epoxy-1,2-cyclohexane dicarboxyimide) and trifunctional and polyfunctional epoxy compounds such as triglycidyl compound of p-aminophenyl, 1,3,5-tri(1,2-epoxyethyl)-benzene, tetraglycidoxytetraphenylethane and polyglycidyl ethers of phenolformaldehyde novolak resins. They further include epoxy compounds having hydantoin skeleton and epoxy compounds containing halogen atoms.

As the amine, imidazole and onium salts used in the present invention, there may be mentioned, for example, tetramethylbutanediamine, benzyldimethylamine, 2,4,6-tris(dimethylaminophenol), tetramethylguanidine, guanidine, 2-methylimidazole, 2-ethyl-4-methylimidazole, 2-ethylimidazole, 2-isopropylimidazole, 2-undecylimidazole, 2-phenylimidazole, 2,4'-dimethylimidazole as well as their azine derivatives, Kalibor salts, triellitic acid salts and nitriloethyl derivatives, and tetrabutyl-ammonium tetraphenyl borate and tetramethyl ammonium fluoride.

In the reaction of above compounds (I) and (II) or above compounds (I), (II) and epoxy compounds under heating to obtain the prepolymer, the reaction conditions comprise a temperature of 70°–180° C. and a time of 5–240 minutes, preferably 80°–150° C. and 10–180 minutes. In this reaction, a low boiling solvent such as acetone, methyl ethyl ketone or methyl cellosolve may be used suitably.

The amounts of the compounds to be reacted are preferably in the following ranges: Molar ratio of compound (I) to compound (II) to be reacted is in the range of 10:1 to 1:1.2. An epoxy compound is suitably used in an amount of 20–70 wt. % based on the whole composition. If an amount of compound (II) is too small, the curing property is insufficient and, in addition, solubility of the prepolymer to the low boiling point solvents is also lowered. If the amount of compound (II) is excessive, heat resistance of the cured product is reduced seriously. If an amount of epoxy compound is more than 20 wt. %, it exerts the influence on the curing property of the composition. If an epoxy compound is more than 70 wt. %, the heat resistance may be reduced.

As for the amount of the curing accelerator, the sufficient effects thereof can be obtained with about 0.1–5.0 wt. % based on the whole composition. The curing accelerator is generally added after the preparation of the uncured reaction product of compounds (I) and (II), i.e. the prepolymer, in the second invention. However, the equivalent effects can also be obtained by adding the same in the step of the prepolymer preparation.

The prepolymer obtained as above is soluble in low boiling solvents such as acetone, methyl ethyl ketone and methyl cellosolve to an extent of at least 50% (solid weight) and, therefore, a varnish of a high concentration can easily be prepared therefrom. If the prepolymer is further heated to effect the additional reaction, the insoluble, infusible resin having an extremely high heat resistance can be obtained.

The great characteristic feature of the present invention resides in the use of specific aromatic diamine compound (II) containing two ether bonds as the diamine to be combined with maleimide compound (I) as described above. A heat resistant polymer obtained by the polymerization/ring closure of maleamic acid amine which is an adduct of maleic anhydride or and derivative thereof with a diamine has already been known (see, for example, the specification of Japanese Patent Publication No. 37730/1971). However, if the known diamine is used, the prepolymer having a high solubility in a solvent as that shown in the present invention cannot be obtained and the resin which exhibits an extremely high heat resistance upon curing cannot be obtained. Consequently, it is supposed that the specific structure of diamine compound (II) used in the present invention exhibits the above characteristic properties when it is reacted with the maleimide compound. If the epoxy compound used in the present invention is added to the reaction system in the prepolymer-producing step, not only the solubility of the resulting prepolymer is improved but also the curing velocity of the prepolymer in the molding step and also in the postcuring step is increased and the curing properties thereof are further improved.

The prepolymer of the present invention may contain, in addition to the above epoxy resin, unsaturated polyester resins, triallyl isocyanurate resins, diallyl phthalate resins, phenolic resins and aniline resins in the form of a suitable combination.

The following examples further illustrate the present invention and effects thereof, which by no means limit the present invention. Parts are given by weight.

EXAMPLE 1

65 Parts of N,N'-4,4'-diphenylmethane bismaleimide and 35 parts of 2,2-bis[4-(4-aminophenoxy)phenyl]propane were added to 50 parts of methyl cellosolve and the whole was allowed to react under heating to 100°–120° C. for 50 minutes. Then, the liquid was cooled to room temperature and added with 50 parts of methyl ethyl ketone and 0.3 part of 2-ethyl-4-methylimidazole to obtain a red transparent varnish having a solid content of 50 wt. %.

COMPARATIVE EXAMPLE 1

The same procedure as in Example 1 was repeated except that 25 parts of 4,4'-diaminodiphenylmethane were used in place of 35 parts of 2,2-bis[4-(4-aminophenoxy)phenyl]-propane. Precipitates were formed in the whole varnish when methyl ethyl ketone was added thereto.

EXAMPLE 2

70 Parts of N,N'-m-phenylene bismaleimide and 30 parts of 2,2-bis[3-methyl-4-(4-aminophenoxy)phenyl]-propane were added to 50 parts of methyl cellosolve and the whole was allowed to react under heating to 100°–120° C. for 60 minutes. Then, the liquid was cooled to room temperature and added with 50 parts of methyl ethyl ketone and 0.3 part of 2-methylimidazole to obtain a red, transparent varnish having a solid content of 50 wt. %.

COMPARATIVE EXAMPLE 2

The same procedure as in Example 2 was repeated except that 25 parts of 4,4'-diaminodiphenyl ether were used in place of 30 parts of 2,2-bis[3-methyl-4-(4-aminophenoxy)-phenyl]propane. However, precipitates were formed in the whole varnish when methyl ethyl ketone was added thereto.

EXAMPLE 3

80 Parts of a maleimide compound of the formula:

$$\begin{array}{c}
\text{CH}=\text{CH} \\
| \quad | \\
\text{CO} \quad \text{CO} \\
\diagdown\text{N}\diagup \\
| \\
\text{C}_6\text{H}_4\text{—CH}_2\text{—}
\end{array}
\left[\begin{array}{c}
\text{CH}=\text{CH} \\
| \quad | \\
\text{CO} \quad \text{CO} \\
\diagdown\text{N}\diagup \\
| \\
\text{C}_6\text{H}_4\text{—CH}_2\text{—}
\end{array}\right]_{n'}
\begin{array}{c}
\text{CH}=\text{CH} \\
| \quad | \\
\text{CO} \quad \text{CO} \\
\diagdown\text{N}\diagup \\
| \\
\text{C}_6\text{H}_5
\end{array}$$

(The number of $n'$ is 0.8, which is the average number of the group.) and 20 parts of 2,2-bis[4-(4-aminophenoxy)phenyl]propane were added to 50 parts of a mixed solution of methyl ethyl ketone and methyl cellosolve (mixing ratio: 1:1) and the whole was allowed to react at 60°–80° C. for 30 minutes. Then, the liquid was cooled to room temperature and added with 0.5 part of an azine derivative of 2-ethyl-4-methylimidazole of obtain a reddish brown, transparent varnish.

COMPARATIVE EXAMPLE 3

The same procedure as in Example 3 was repeated except that 8 parts of m-phenylenediamine were used as the diamine compound. However, precipitates were formed in the whole varnish and the intended prepolymer highly soluble in low boiling solvents could not be obtained.

EXAMPLE 4

80 Parts of N,N'-4,4'-diphenylmethane bismaleimide and 20 parts of 2,2-bis[4-(4-aminophenoxy)phenyl]propane were added to 50 parts of methyl cellosolve and the whole was allowed to react at 100°–120° C. for 50 minutes. Then, the liquid was cooled to room temperature and added with 50 parts of methyl ethyl ketone and 0.2 part of 2-methyl-imidazole to obtain a red, transparent varnish.

COMPARATIVE EXAMPLE 4

The same procedure as in Example 4 was repeated except that 15 parts of 4,4'-diaminodiphenylsulfone were used as the diamine compound. However, precipitates were formed in the whole varnish and the intended prepolymer highly soluble in low boiling solvents could not be obtained.

EXAMPLE 5

30 Parts of N,N'-4,4-diphenylmethane bismaleimide, 40 parts of a maleimide compound of the formula:

$$\begin{array}{c}
\text{CH}=\text{CH} \\
| \quad | \\
\text{CO} \quad \text{CO} \\
\diagdown\text{N}\diagup \\
| \\
\text{C}_6\text{H}_4\text{—CH}_2\text{—}
\end{array}
\left[\begin{array}{c}
\text{CH}=\text{CH} \\
| \quad | \\
\text{CO} \quad \text{CO} \\
\diagdown\text{N}\diagup \\
| \\
\text{C}_6\text{H}_4\text{—CH}_2\text{—}
\end{array}\right]_{1.2}
\begin{array}{c}
\text{CH}=\text{CH} \\
| \quad | \\
\text{CO} \quad \text{CO} \\
\diagdown\text{N}\diagup \\
| \\
\text{C}_6\text{H}_5
\end{array}$$

and 30 parts of 2,2-bis[3-ethyl-4-(4-aminophenoxy)phenyl]-propane were directly heated to 130°–150° C. for 20 minutes to melt them and to carry out the reaction. Then, the reaction mixture was dissolved in 50 parts of a mixture solution of methyl cellosolve and methyl ethyl ketone (mixing ratio: 1:1). Finally, 0.3 part of benzyldimethyl-amine was added thereto to obtain a red, transparent varnish having a solid content of 50 wt. %.

COMPARATIVE EXAMPLE 5

The same procedure as in Example 5 was repeated except that 24 parts of methylenebis(3-chloro-p-phenylene)diamine were used as the diamine compound. However, precipitates were formed in the whole varnish and the intended prepolymer highly soluble in low boiling solvents could not be obtained.

A glass cloth having a thickness of 0.18 mm which had been treated with aminosilane was impregnated with each of the varnishes of Examples 1–5 and dried at 130°–150° C. for 10 minutes to obtain the coated cloth having a resin content of 40±2 wt. %. Then, 8 sheets of each cloth were put together in layers and adhered under a pressure of 50 kg/cm² at 170° C. for 60 minutes to obtain a laminates having a thickness of about 1.6 mm.

For comparison, the varnish of typical aminobismaleimide prepolymer obtained in Comparative Example 1 was prepared using 50 parts of N-methyl-2-pyrrolidone (boiling point: about 202° C.) as the solvent. Then, the coated cloth and laminated plate were prepared in the same manner as above except that the lamination was effected under a pressure of 80 kg/cm² at 180° C. for 90 minutes, since the prepolymer obtain in Comparative Example 1 had a high viscosity at the time of the solution and a low curing speed.

Properties of the resins collected from the coated cloths and those of the laminates prepared as above were examined to obtain the results shown in Table 1. The results obtained from ordinary epoxy laminate are also shown. In the table, weight reduction-starting temperature is that obtained by measuring weight reduction properties while the sample is heated in air at a temperature weight reduction properties while the sample is heated in air at a temperature elevation rate of 4° C./min. The weight reduction at 500° C. is a value measured when the temperature has reached 500° C. The bending strength is a ratio of the bending strength at each temperature to that measured at 20° C. The bending strength after the deterioration is a retention ratio of bending strength after the deterioration by heating in air at 220° for a given period of time to the initial bending strength. The measurement was effected at room temperature (20° C.).

TABLE 1

| Molding and postcuring conditions and properties | Example | | | | | Comp. Example | |
|---|---|---|---|---|---|---|---|
| | 1 | 2 | 3 | 4 | 5 | 1 | Epoxy laminate |
| Molding conditions | | | | | | | |

TABLE 1-continued

| Molding and postcuring conditions and properties | Example 1 | Example 2 | Example 3 | Example 4 | Example 5 | Comp. Example 1 | Epoxy laminate |
|---|---|---|---|---|---|---|---|
| Temperature (°C.) | 170 | 170 | 170 | 170 | 170 | 180 | 170 |
| Time (minutes) | 60 | 60 | 60 | 60 | 60 | 90 | 60 |
| Postcuring conditions | | | | | | | |
| Temperature (°C.) | 230 | 230 | 230 | 230 | 230 | 250 | — |
| Time (minutes) | 60 | 60 | 60 | 60 | 60 | 180 | — |
| Weight reduction starting temperature (°C.) | 415 | 420 | 410 | 425 | 415 | 395 | 340 |
| Weight reduction at 500° C. | 15 | 12 | 17 | 10 | 12 | 23 | 65 |
| Glass transition temp. (°C.) | 230 | 235 | 250 | 230 | 245 | 220 | 120 |
| Bending strength (%) | | | | | | | |
| 100° C. | 96 | 95 | 96 | 95 | 95 | 95 | 70 |
| 150° C. | 94 | 92 | 93 | 91 | 92 | 90 | 45 |
| 200° C. | 90 | 88 | 90 | 87 | 87 | 82 | — |
| 250° C. | 85 | 82 | 85 | 83 | 85 | 81 | — |
| Bending strength after deterioration (%) | | | | | | | |
| 500 hours | 100 | 100 | 100 | 100 | 100 | 100 | — |
| 1000 hours | 97 | 96 | 95 | 95 | 97 | 90 | — |
| 1500 hours | 90 | 92 | 90 | 90 | 92 | 80 | — |
| 2000 hours | 85 | 82 | 83 | 84 | 85 | 70 | — |

Note: — unmeasurable (softened)

EXAMPLE 6

35 Parts of N,N'-4,4'-diphenylmethane bismaleimide and 20 parts of 2,2-bis[4-(4-aminophenoxy)phenyl]propane were added to 50 parts of methyl cellosolve and the whole was allowed to react under heating to 100°–200° C. for 40 minutes. Then, the liquid was cooled to 90° C. and added with 45 parts of phenol novolak epoxy resin (DEN-438; a product of Dow Chemical Co.). The whole was further allowed to react at 80°–90° C. for 30 minutes. Then, the liquid was cooled to room temperature and added with 2.0 parts of dicyandiamide and 50 parts of methyl ethyl ketone to obtain a red, transparent varnish having a solid content of 50 wt. %.

EXAMPLE 7

50 Parts of N,N'-m-phenylene bismaleimide and 20 parts of 2,2-bis[3-methyl-4-(4-aminophenoxy)phenyl]propane were added to 50 parts of methyl cellosolve and the whole was allowed to react at 100°–120° C. for 50 minutes. Then, the liquid was cooled to 90° C. and added with 30 parts of epoxy resin of bisphenol A type (Epikote 828; a product of Shell International Chemicals Corp.). The whole was further allowed to react at 80°–90° C. for 30 minutes. Then, 50 parts of methyl ethyl ketone and 0.15 part of 2-ethyl-4-methylimidazole were added thereto to obtain a red, transparent varnish having a solid content of 50 wt. %.

EXAMPLE 8

40 Parts of N,N'-diphenylmethane bismaleimide, 10 parts of 2,2-bis[4-(4-aminophenoxy)phenyl]propane, 35 arts of triglycidyl ether isocyanurate and 2.0 parts of dicyandiamide were added to 70 parts of methyl cellosolve and the whole was allowed to react at 100°–120° C. for 40 minutes. Then, the liquid was cooled to room temperature and added with 50 parts of methyl ethyl ketone to obtain a reddish brown, transparent varnish having a solid content of 50 wt. %.

EXAMPLE 9

40 Parts of maleimide compound of the formula:

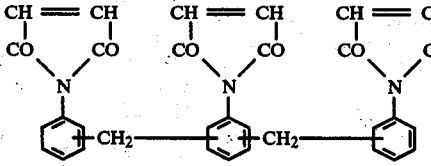

and 10 parts of 2,2-bis[4-(4-aminophenoxy)phenyl]propane were added to 100 parts of a mixed solution of methyl ethyl ketone and methyl cellosolve (mixing ratio: 1:1) and the whole was allowed to react at 60°–80° C. for 20 minutes. Then, 50 parts of epoxy resin of phenol novolak type (DEN-438; a product of Dow Chemical Co.) were added thereto and the whole was further allowed to react for 20 minutes. Then, the liquid was cooled to room temperature and added with 0.2 part of an azine derivative of 2-methyl-imidazole to obtain a red, transparent varnish having a solid content of 50 wt. %.

A glass cloth having a thickness of 0.18 mm which had been treated with aminosilane was impregnated with each of the varnishes of Examples 6–9 and dried at 130°–150° C. for 10 minutes to obtain the coated cloth having a resin content of 40±2 wt. %. Then, 8 sheets of each cloth were put together in layers and adhered under a pressure of 50 kg/cm² at 170° C. for 60 minutes to obtain a laminated plate having a thickness of about 1.6 mm.

COMPARATIVE EXAMPLE 6

78 Parts of N,N'-4,4'-diphenylmethane bismaleimide and 22 parts of 4,4'-diaminodiphenylmethane were added to N-methyl-2-pyrrolidone which is a specific solvent having a boiling point of about 202° C. and the whole was allowed to react at 100°–130° C. for 30 minutes to obtain a varnish having a solid content of 50 wt. %. This resin was a typical, conventional amino bismaleimide resin. In case methyl cellosolve was used as the reaction solvent, precipitates were formed upon cooling to room temperature. Then, a coated cloth and alminated plate were prepared in the same manner as in Examples 6–9 except that the lamination was effected under a pressure of 80 kg/cm² at 180° C. for 90 minutes, since the prepolymer obtained in Comparative Example 6 had a high viscosity at the time of the melting and a low curing speed.

Properties of the resins collected from the coated cloths and those of the laminates prepared in Examples 6–9 and Comparative Example 6 were examined to obtain the results shown in Table 2. Weight reduction-starting temperature, weight reduction at 500° C., bending strength and bending strength after deterioration in Table 2 have the same meanings as those shown in Table 1. Water absorption under boiling was determined according to the specification of JIS K 6911.

TABLE 2

| Molding and postcuring conditions and properties | Example | | | | Comparative Example |
|---|---|---|---|---|---|
|  | 6 | 7 | 8 | 9 | 6 |
| Molding conditions |  |  |  |  |  |
| Temperature (°C.) | 170 | 170 | 170 | 170 | 180 |
| Time (minutes) | 60 | 60 | 60 | 60 | 90 |
| Postcuring conditions |  |  |  |  |  |
| Temperature (°C.) | 200 | 200 | 200 | 200 | 250 |
| Time (minutes) | 120 | 120 | 120 | 120 | 180 |
| Weight reduction starting temperature (°C.) | 390 | 385 | 395 | 390 | 395 |
| Weight reduction at 500° C. | 25 | 22 | 23 | 25 | 23 |
| Glass transition temp. (°C.) | 210 | 230 | 215 | 210 | 220 |
| Bending strength (%) |  |  |  |  |  |
| 100° C. | 96 | 95 | 95 | 94 | 95 |
| 150° C. | 90 | 89 | 90 | 90 | 90 |
| 200° C. | 85 | 85 | 82 | 84 | 82 |
| 250° C. | 80 | 78 | 76 | 80 | 81 |
| Bending strength after deterioration (%) |  |  |  |  |  |
| 500 hours | 100 | 100 | 100 | 100 | 100 |
| 1000 hours | 95 | 96 | 95 | 92 | 90 |
| 1500 hours | 85 | 86 | 85 | 84 | 80 |
| 2000 hours | 80 | 77 | 78 | 72 | 70 |
| Water absorption under boiling (%) | 0.20 | 0.25 | 0.20 | 0.23 | 0.65 |

It is apparent from Tables 1 and 2 that the prepolymers prepared by the process of the present invention have an extremely high solubility in low boiling solvents. This is advantageous for the working. Laminates prepared from those prepolymers have higher heat resistance and lower water absorptions under boiling as compared with those of laminates prepared from ordinary imide resins. (It has been recognized that water absorptions under boiling of the epoxy resin-free laminates obtained in Examples 1–5 were 0.4–0.5%).

As described above, according to the present invention, heat resistant resins soluble in low boiling solvents and having excellent workabilities which exhibit high heat resistances upon curing can be provided.

What we claim is:

1. A maleimide resin composition comprising a maleimide-diamine adduct having the recurring units:

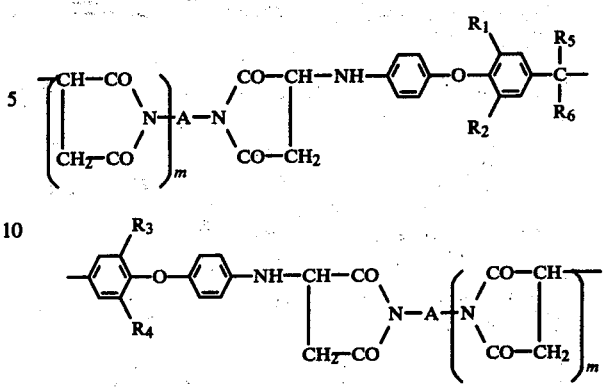

wherein A represents a mono-, di-, tri-or tetravalent organic group containing at least two carbon atoms, m represents an integer of 0 ro 4, $R_1$ through $R_4$ which are the same or different represent hydrogen atom, a lower alkyl group, a lower alkoxy group, chlorine atom or bromine atom, and $R_5$ and $R_6$ which are the same or different represent hydrogen atom, methyl group, ethyl group, trifluoromethyl group or trichloromethyl group, said adduct being soluble in an organic solvent having a boiling point of 130° C. or lower to form a solution of a concentration of 50% or more.

2. A maleimide resin composition according to claim 1, further comprising a curing accelerator selected from the group of organic amines, imidazoles or onium salts.

3. A maleimide resin composition according to claim 1, wherein said adduct has a molecular weight from about 450 to about 4300.

4. A process for producing a heat resistant resin, comprising heating and reacting a reaction mixture comprising (I) a maleimide compound of the general formula:

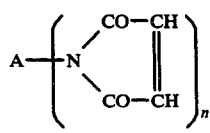

wherein A represents a mono-, di-, tri- or tetravalent organic group containing at least two carbon atoms and n represents an integer of 1–5 and (II) an ether bond-containing diamine compound of the general formula:

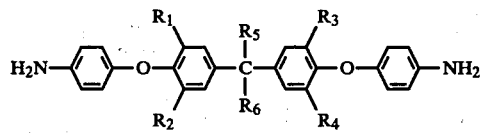

wherein $R_1$ through $R_4$ which are the same or different from one another represent a hydrogen atom, a lower alkyl group, a lower alkoxyl group, chlorine atom or bromine atom, and $R_5$ and $R_6$ which are the same as or different from each other represent hydrogen atom, methyl group, ethyl group, trifluoromethyl group or trichloromethyl group.

5. A process for producing a heat resistant resin according to claim 4 wherein molar ratio of maleimide compound to diamine compound to be reacted is in the range of 10:1 to 1:1.2.

6. A process for producing a heat-resistant resin according to claim 4 wherein the reaction mixture comprises at least one curing accelerator selected from the group consisting of amines, imidazoles and onium salts.

7. A process for producing a maleimide resin which comprises the steps of reacting a maleimide compound having the general formula

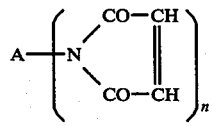

with a diamine having the general formula:

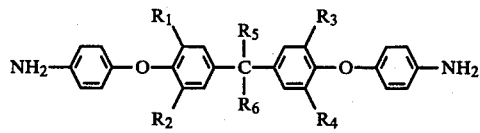

to produce a maleimide-diamine adduct having the general formula:

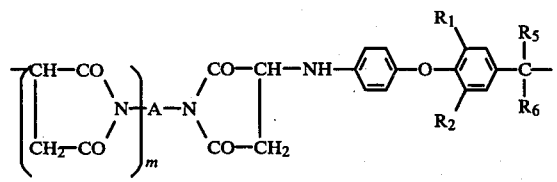

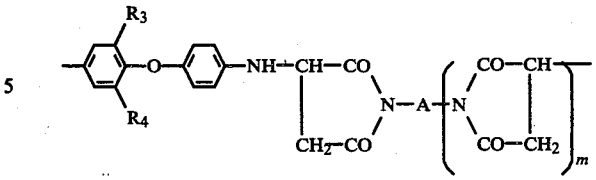

wherein A represents a mono-, di-, tri- or tetravalent organic group containing at least two carbon atoms, n represents an integer of 1 to 5, m represents an integer of 0 to 4, $R_1$ through $R_4$ which are the same or different represent hydrogen atom, a lower alkyl group, a lower alkoxy group, chlorine atom or bromine atom, and $R_5$ and $R_6$ which are the same or different represent hydrogen atom, methyl group, ethyl group, trifluoromethyl group or trichloromethyl group.

8. The heat resistant resin produced by the process of claim 4, 5 or 6.

9. A maleimide resin composition comprising a maleimide-diamine adduct produced by heating and reacting a reaction mixture comprising at least one maleimide compound selected from the group consisting of N,N'-hexamethylene bismaleimide, N-phenylmaleimide, N,N'-m-phenylene bismaleimide, N,N'-p-phenylene bismaleimide, N,N'-4,4'-diphenylmethane bismaleimide, N,N'-4,4'-diphenyl ether bismaleimide, N,N'-methylene bis(3-chloro-p-phenylene) bismaleimide, N,N'-4,4'-diphenylsulfone bismaleimide, N,N'-4,4'-dicyclo-hexylmethane bismaleimide, N,N'-α,α'-4,4'-dimethylenecyclohexane bismaleimide, N,N'-m-xylene bismaleimide, N,N'-4,4'-diphenylcyclohexane bismaleimide and polyvalent maleimides of the following formula obtained from aniline, formaldehyde condensate and maleic anhydride:

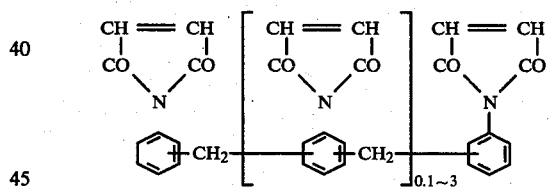

with at least one ether bond-containing diamine compound selected from the group consisting of 2,2'-bis[4-(4-aminophenoxy)phenyl]propane, 2,2'-bis[3-methyl-4-(4-aminophenoxy)phenyl]propane, 2,2'-bis[3-chloro-4-(4-aminophenoxy)phenyl]propane, 2,2'-bis[3-bromo-4-(4-aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isopropyl-4-(4-aminophenoxy)phenyl]propane, 2,2-bis[3-butyl-4-(4-aminophenoxy)phenyl]propane, 2,2-bis[3-sec.-butyl-4-(4-aminophenoxy)phenyl]propane, 2-2-bis[3-methoxy-4-(4aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl] methane, bis[3-bromo-4-(4-aminophenoxy)phenyl]methane, 1,1,1,3,3-hexafluoro-2, 2-bis[4-(4-aminophenoxy)phenyl]propane, 1,1,1,3,3,3-hexachloro-2, 2-bis[4-(4-aminophenoxy)phenyl]propane, 3,3-bis[4-

(4-aminophenoxy)phenyl]pentane, 1,1-bis[4-(4-aminophenoxy)phenyl]propane, 1,1,1,3,3,3-hexafluoro-2,2-bis[3,5-dimethyl-4-(4-aminophenoxy)phenyl]propane, 1,1,1,3,3,3-hexafluoro-2,2-bis-[3,5-dibromo-4-(4-aminophenoxy)phenyl]propane, and 1,1,1,3,3,3-hexafluoro-2,2-bis[3-methyl-4-(4-aminophenoxy)phenyl]propane.

10. A maleimide resin composition according to claim 9, produced from a mixture consisting essentially of said at least one maleimide and said at least one ether bond-containing diamine.

11. A maleimide resin composition according to claim 9, wherein said adduct has a molecular weight from about 450 to about 4300.

12. A maleimide resin composition according to claim 9, wherein said at least one maleimide compound is N,N'-4,4'-diphenylmethane bismaleimide and said at least one ether bond-containing diamine compound is 2,2-bis[4-(4-aminophenoxy)phenyl]propane.

13. A maleimide resin composition according to claim 9, wherein said at least one maleimide compound is N,N'-m-phenylene bismaleimide and said at least one ether bond-containing diamine compound is 2,2-bis[3-methyl-4-(4-aminophenoxy)phenyl]propane.

14. A maleimide resin composition according to claim 9, wherein said at least one maleimide compound is:

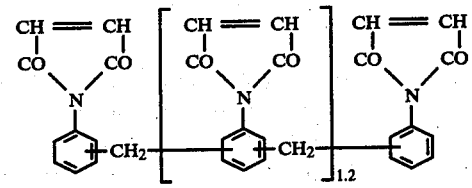

and said at least one ether bond-containing diamine compound is 2,2-bis[4-(4-aminophenoxy)phenyl]propane.

15. A maleimide resin composition according to claim 9, wherein said at least one maleimide compound is N,N'-4,4-diphenylmethane bismaleimide and and said at least one ether bond-containing diamine compound is 2,2-bis[3-ethyl-4-(4-aminophenoxy)phenyl]propane.

16. A maleimide resin composition according to claim 9, wherein said reaction mixture contains a low boiling solvent selected from the group consisting of acetone, methyl ethyl ketone and methyl cellosolve.

* * * * *